United States Patent [19]

Yamamoto

[11] Patent Number: 5,557,665
[45] Date of Patent: Sep. 17, 1996

[54] TELEPHONE SYSTEM

[75] Inventor: Keiji Yamamoto, Hino, Japan

[73] Assignee: Toshiba Corporation, Kanagawa-Ken, Japan

[21] Appl. No.: 263,381

[22] Filed: Jun. 22, 1994

[30] Foreign Application Priority Data

Jun. 23, 1993 [JP] Japan .................................. 5-151793

[51] Int. Cl.⁶ .......................... H04M 3/38; H04M 1/57; H04M 1/276
[52] U.S. Cl. .................. 379/198; 379/354; 379/357; 379/117
[58] Field of Search .................. 379/93–96, 154, 379/157, 165, 167, 177, 196–201, 216, 243, 244, 354–357, 376, 387, 90, 91, 142, 114, 38, 88, 117

[56] References Cited

U.S. PATENT DOCUMENTS

| | | | |
|---|---|---|---|
| 4,680,785 | 7/1987 | Akiyama et al. | 379/142 |
| 4,707,592 | 11/1987 | Ware | 379/91 |
| 4,736,405 | 4/1988 | Akiyama | 379/201 |
| 4,759,056 | 7/1988 | Akiyama | 379/142 |
| 4,763,354 | 8/1988 | Fukushima et al. | 379/165 |
| 4,782,514 | 11/1988 | Oshikata et al. | 379/165 |
| 4,821,316 | 4/1989 | Okumura et al. | 379/165 |
| 4,823,377 | 4/1989 | Sugiura et al. | 379/165 |
| 4,843,377 | 6/1987 | Fuller et al. | 379/38 |
| 4,899,373 | 2/1990 | Lee et al. | 379/201 |
| 4,924,499 | 5/1990 | Serby | 379/200 |
| 5,062,134 | 10/1991 | Laird | 379/190 |
| 5,119,414 | 6/1992 | Izumi | 379/90 |
| 5,266,782 | 11/1993 | Alanärä et al. | 379/91 |
| 5,327,482 | 7/1994 | Yamamoto | 379/114 |
| 5,371,785 | 12/1994 | Marcinkiewicz | 379/201 |
| 5,384,834 | 1/1995 | Sato et al. | 379/88 |
| 5,406,619 | 4/1995 | Akhteruzzaman et al. | 379/95 |

*Primary Examiner*—Wing F. Chan
*Attorney, Agent, or Firm*—Finnegan, Henderson, Farabow, Garrett & Dunner, L.L.P.

[57] ABSTRACT

A telephone system has a plurality of telephone terminals, a plurality of individual identification information input devices associated with the telephone terminals, respectively, for entering individual identification information, telephone terminal data memory devices for storing telephone terminal data corresponding to individual identification information and related to telephone services accessible through the telephone terminals, a first memory table for storing data to retrieve individual identification information from one of the telephone terminals which is used, a table manager for rewriting the data stored in the first memory table in a manner to associate individual identification information with the used telephone terminal each time the individual identification information is entered from the individual identification information input device associated with the used telephone terminal, a data retriever responsive to use of the used telephone terminal for searching the first memory table to retrieve individual identification information and obtaining telephone terminal data corresponding to the retrieved individual identification information from the telephone terminal data memory devices, and a telephone service executing device for executing a telephone service based on the obtained telephone terminal data with respect to the used telephone terminal.

26 Claims, 15 Drawing Sheets

ID

TELEPHONE SYSTEM

BACKGROUND OF THE INVENTION

1. Field of the Invention

The present invention relates to a telephone system such as an electronic private branch exchange which accommodates key telephone sets, and more particularly to a telephone system for providing users with a variety of telephone services.

2. Description of the Prior Art

Telephone systems such as electronic private branch exchanges employ multifunction telephone sets connected as exchange telephone terminals, and service functions are assigned to function keys of the multifunction telephone sets for providing users with various telephone services. When a user operates a function key corresponding to a desired one of available exchange services, the user can access the desired exchange service.

Function keys are set to respective service functions in a manner unique to each of the telephone terminals. There are certain available telephone services in which inherent information used in those telephone services differs from telephone terminal to telephone terminal. For example, the user of a telephone terminal which is allotted to that user may assign a one-touch dial key to a certain function key, and may register a desired number as the telephone number of a party. Therefore, each user can set inherent information on his own telephone terminal and can access an exchange service through a simple operation from his own telephone terminal. However, when each user uses a telephone terminal other than his own telephone terminal, e.g., a telephone terminal in a conference room or a telephone set shared by many people as in a dormitory telephone system, the user cannot operate the telephone terminal simply using inherent information or set an inherent function key.

Consequently, the conventional telephone systems pose no problems insofar as long as telephone terminals are assigned to individuals and allow users to set inherent information. If a telephone terminal or set of the conventional telephone systems is shared by many individuals, however, no inherent information can be set by users or a set of function keys cannot be assigned to certain service functions on that shared telephone terminal. Therefore, users of the shared telephone terminal have to access exchange services without relying on a simple operation which would otherwise be available on individual's telephone terminals for those exchange services.

SUMMARY OF THE INVENTION

It is therefore an object of the present invention to provide a telephone system which allows users of a shared telephone set or terminal to establish settings of their own on that shared telephone set for gaining access to exchange services through a simple operation.

According to the present invention, there is provided a telephone system comprising a plurality of telephone terminals, a plurality of individual identification information input means associated with the telephone terminals, respectively, for entering individual identification information, telephone terminal data memory means for storing telephone terminal data corresponding to the individual identification information in one-to-one correspondence and related to telephone services accessible through the telephone terminals, a first memory table for storing data to retrieve individual identification information from one of the telephone terminals which is used, table managing means for rewriting the data stored in the first memory table in a manner to associate individual identification information with the used telephone terminal each time the individual identification information is entered from the individual identification information input means associated with the used telephone terminal, data retrieving means responsive to use of the used telephone terminal for searching the first memory table to retrieve individual identification information and obtaining telephone terminal data corresponding to the retrieved individual identification information from the telephone terminal data memory means, and telephone service executing means for executing a telephone service based on the obtained telephone terminal data with respect to the used telephone terminal.

The telephone terminal data related to telephone services accessible through the telephone terminals correspond to the individual identification information in one-to-one correspondence. The individual identification information input means for entering individual identification information are associated respectively with the telephone terminals. Each time individual identification information is entered from the individual identification information input means, the data in the first memory table in which the individual identification information is associated with the telephone terminals are rewritten. That is, information as to which person is going to use a telephone terminal is varied. When the telephone terminal is used, the first memory table is searched for individual identification information, and the telephone terminal data corresponding to the individual identification information are obtained from the telephone terminal data memory means. Then, a telephone service based on the telephone terminal data thus obtained is executed with respect to the used telephone terminal by the telephone service executing means. Even when the user uses a shared telephone terminal such as a telephone set in a conference room, a dormitory telephone set, or a telephone set assigned to another user, the shared telephone terminal changes its setting such that it operates as if it is assigned to the user, so that the user can access a desired telephone service simply through that shared telephone terminal.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
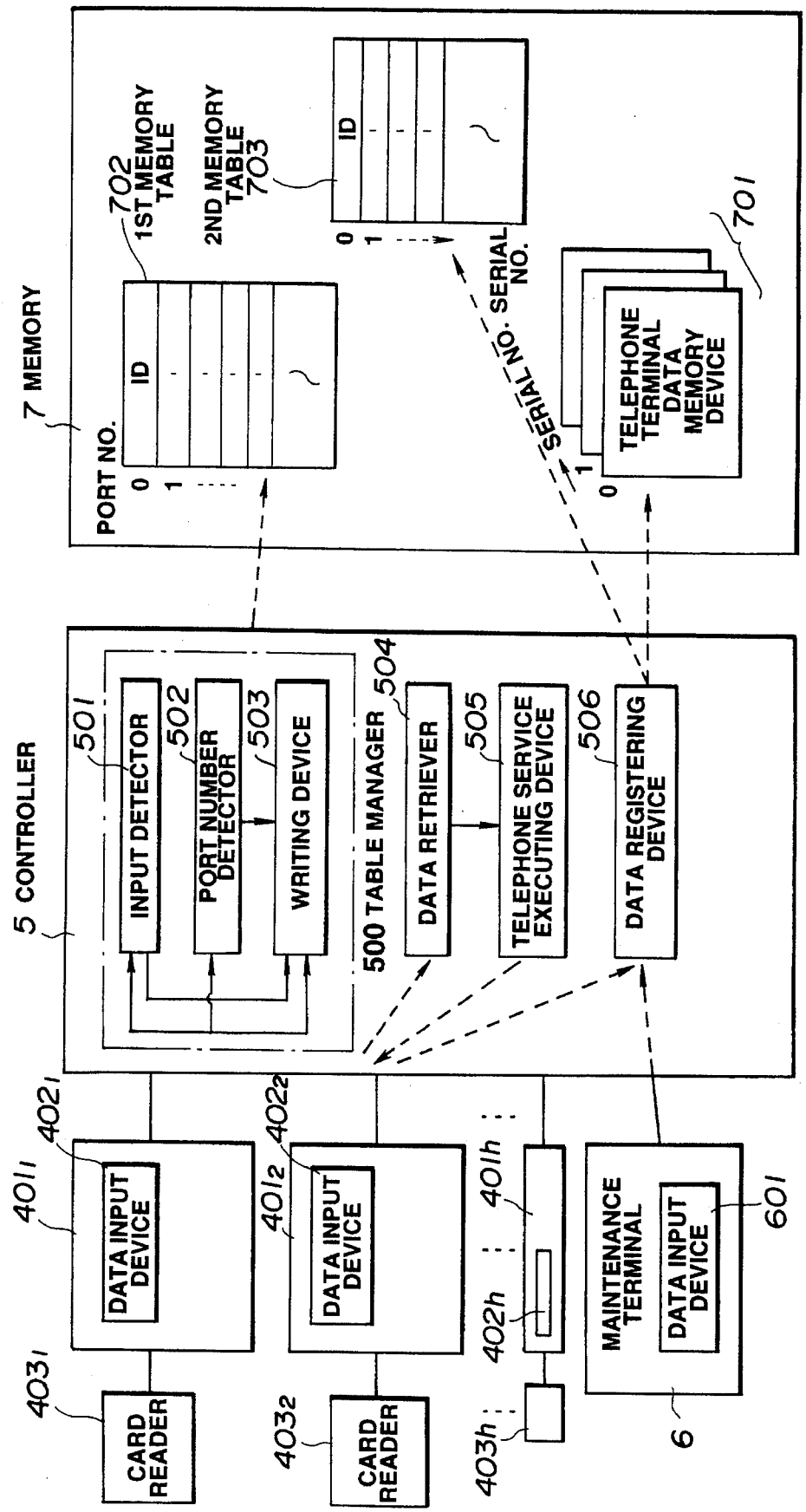
FIG. 1 is a functional block diagram of a telephone system according to an embodiment of the present invention.

The functional blocks of a telephone system according to the present invention are illustrated in FIG. 1. As shown in FIG. 1, a telephone system according to the present invention includes a plurality of telephone terminals or sets $401_1$~$401_h$ having respective data input devices $402_1$~$402_h$ such as dial keys and various function keys and respective display units such as LCDs for displaying necessary information. A plurality of magnetic card readers $403_1$~$403_h$ as individual information input devices are connected respectively to the respective telephone terminals $401_1$~$401_h$. Data entered from the data input devices $402_1$~$402_h$ or the card readers $403_1$~$403_h$ are supplied to a controller 5. To the controller 5, there is connected a maintenance terminal 6 having a data input device 601 comprising various keys which are used when information is to be stored in a memory 7. The memory 7 has a plurality of telephone terminal data memory devices 701 which store telephone terminal data corresponding to respective individual identification information (ID code) and related to telephone services to be accessed through the telephone terminals. The memory 7 also has a first memory table 702 which stores data to retrieve individual identification information from telephone terminal information that is used, and a second memory table 703 which stores individual identification information corresponding to serial numbers.

The controller 5 has a table manager 500 which, each time individual identification information is entered from one of the card readers $403_1$~$403_h$, associates the entered individual identification information with the corresponding telephone terminal and rewrites data in the first memory table 702, a data retriever 504 which, when a telephone terminal is used, searches the first memory table 702 for the corresponding individual identification information and obtains telephone terminal data corresponding to the individual identification information from one of the telephone terminal data memory devices 701, and a telephone service executing device 505 for executing a telephone service based on the telephone terminal data obtained by the data retriever 504, with respect to the telephone terminal that is being used. The table manager 500 comprises an input detector 501 for detecting whether individual identification information from a telephone terminal has entered from one of the card readers $403_1$~$403_h$, or not, a port number detector 502 for detecting the port number of a telephone terminal from which individual identification information has arrived, and a writing device 503 for storing the individual identification information detected by the input detector 501 in the first memory table 701 in association with the port number detected by the port number detector 502.

The telephone terminal data memory devices 701 store telephone terminal data in association with serial numbers. The data input device 601 of the maintenance terminal 6 is used to enter data for the telephone terminal data memory devices 701 and data for the second memory table 703. The controller 5 has a data registering device 506 for registering data from the data input device 601 in the telephone terminal data memory devices 701 and the second memory table 703.

Figure 2:
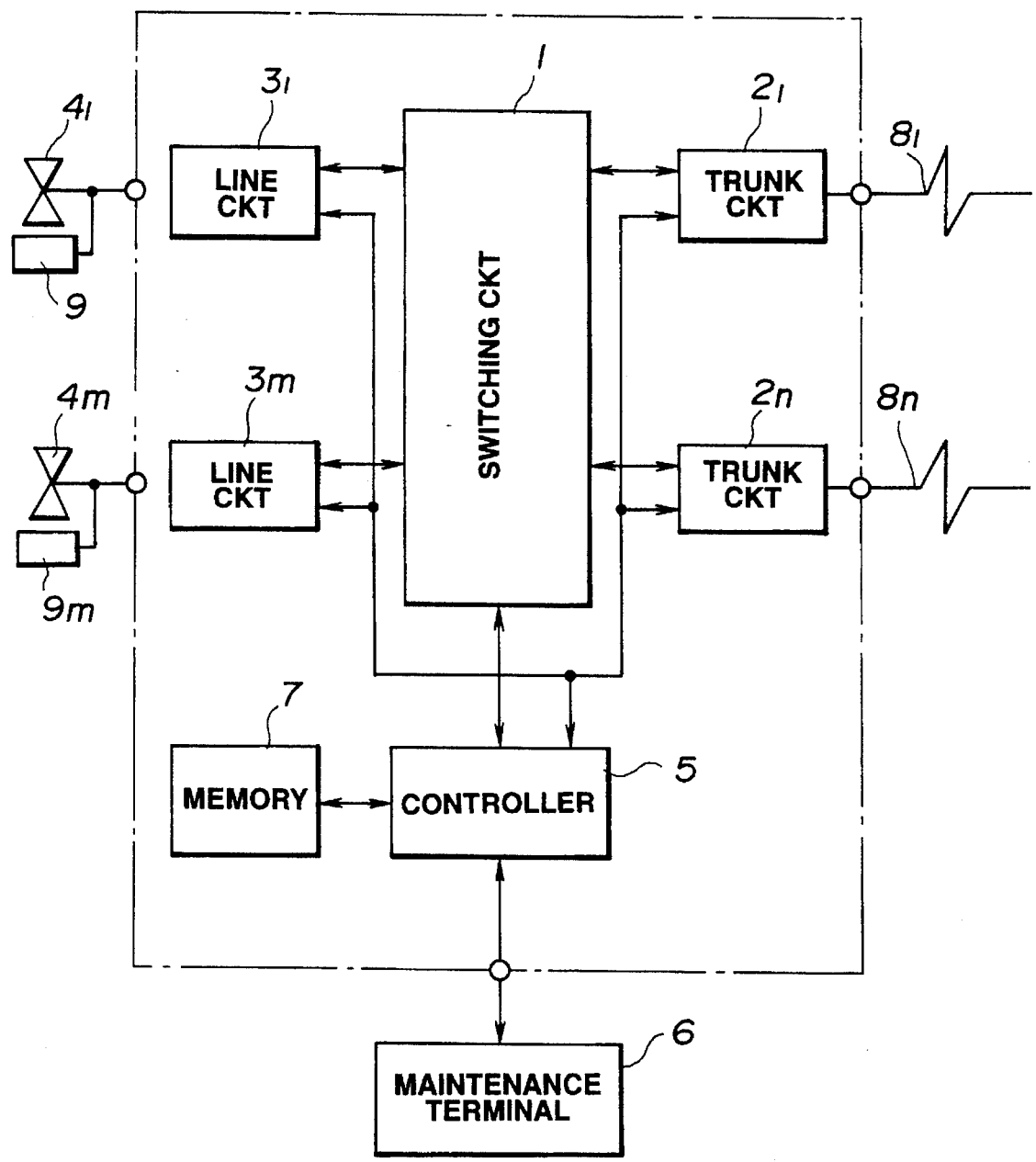
FIG. 2 is a block diagram of an electronic private branch exchange according to the present invention.

The functions of the telephone system shown in FIG. 1 are implemented by an electronic private branch exchange as shown in FIG. 2.

In FIG. 2, the electronic private branch exchange has a switching circuit 1 for making connections between line circuits $3_1$~$3_m$ or between the line circuits $3_1$~$3_m$ and trunk circuits $2_1$~$2_n$. The line circuits $3_1$~$3_m$ are connected to respective telephone terminals $4_1$~$4_m$, and the trunk circuits $2_1$~$2_n$ are connected respective trunks $8_1$~$8_n$. A controller 5, which is connected to the switching circuit 1, the line circuits $3_1$~$3_m$, and the trunk circuits $2_1$~$2_n$, effects switching in the switching circuit 1, and exchanges dial data and detected incoming call data with the telephone terminals $4_1$~$4_m$ through the line circuits $3_1$~$3_m$. A memory 7, which is connected to the controller 5, stores programs for controlling the various devices shown in FIG. 1, the telephone terminal data memory devices, and the memory tables. A maintenance terminal 6, which is also connected to the controller 5, has a keyboard and a display unit such as an liquid crystal display (LCD) unit, and serves to enter various operational data. Card readers $9_1$~$9_m$ are connected respectively to the telephone terminals $4_1$~$4_m$.

Figure 3:
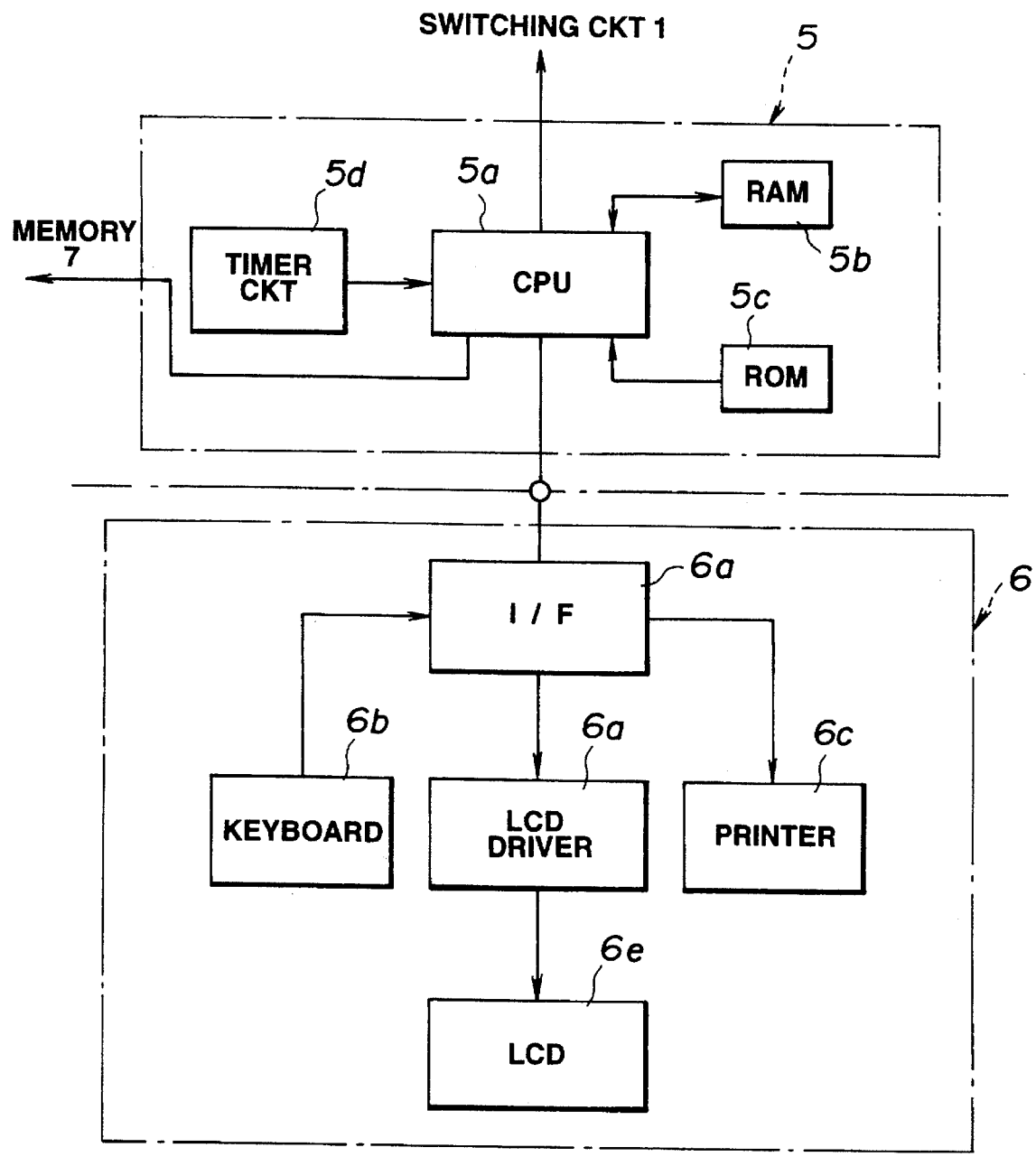
FIG. 3 is a block diagram of a controller and a maintenance terminal in the electronic private branch exchange shown in FIG. 2.

The controller 5 comprises a microcomputer, for example. As shown in FIG. 3, the controller 5 has a central processing unit (CPU) 5a connected to the switching circuit 1 for controlling switching operation, a working random-access memory (RAM) 5b connected to the CPU 5a for storing working data, a read-only memory (ROM) 5c connected to the CPU 5a for storing a control program to control the controller 5, and a timer circuit 5d connected to the CPU 5a for measuring time.

The maintenance terminal 6 comprises an input/output (I/O) interface 6a connected to the CPU 5a for transmitting and receiving control signals and data to and from the CPU 5a, a keyboard 6b connected to the I/O interface 6a for entering various control data, a printer 6c connected to the I/O interface 6a for printing set control data, an LCD driver 6d connected to the I/O interface 6a for outputting character data for data display, and an LCD 6e connected to the LCD driver 6d for displaying various processed data.

Figure 4:
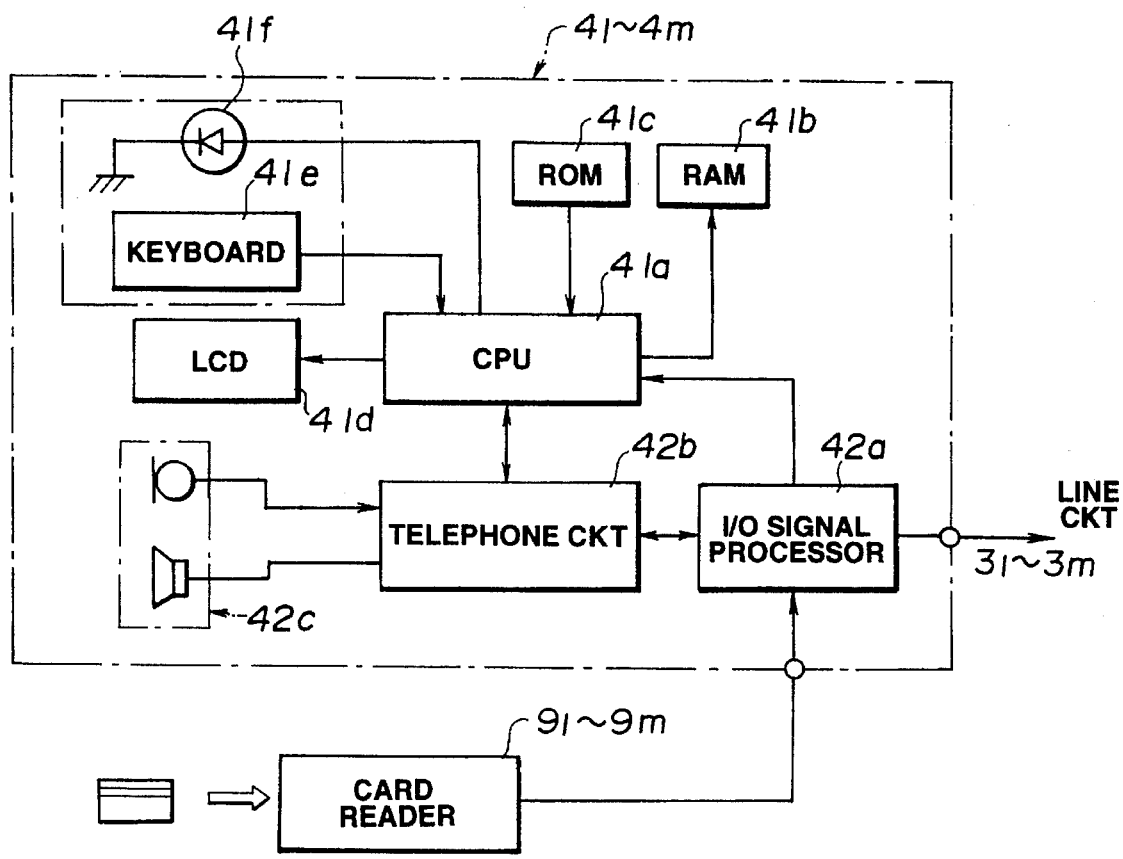
FIG. 4 is a block diagram of a telephone terminal in the electronic private branch exchange shown in FIG. 2.

As shown in FIG. 4, each of the telephone terminals $4_1$~$4_m$ comprises a CPU 41a for controlling the corresponding telephone set, a working RAM 41b connected to the CPU 41a for storing working data, and a ROM 41c connected to the CPU 41a for storing a control program to control the telephone set. To the CPU 41a, there are also connected an LCD 41d for displaying processed data, a keyboard 41e having a ten-key pad and function selecting keys, and light-emitting diodes (LED) 41f combined with the respective function selecting keys and energizable when the corresponding function selecting keys are pressed. Each telephone terminal also includes an input/output (I/O) signal processor 42a connected to the CPU 41a and one of the line circuits $3_1$~$3_m$ for processing input/output signals so that they can be supplied to the CPU 41a and also processing control data from the CPU 41a so that they can be supplied to the line circuits $3_1$~$3_m$. In addition, each telephone terminal has a telephone circuit 42b connected to the CPU 41a and the I/O signal processor 42a for amplifying line or trunk signals and processing a sidetone signal, and a handset 42c connected to the telephone circuit 42b and having a microphone and a loudspeaker. Each telephone terminal further has a hook key (button), not shown.

The card readers $9_1$~$9_m$ are connected respectively to the I/O signal processors 42a of the respective telephone terminals $4_1$~$4_m$. Data of an ID card which are read by each of the card readers $9_1$~$9_m$ are sent through the corresponding I/O signal processor 42a to the CPU 41a, and also transmitted through one of the line circuits $3_1$~$3_m$ to the controller 5.

Figure 5:
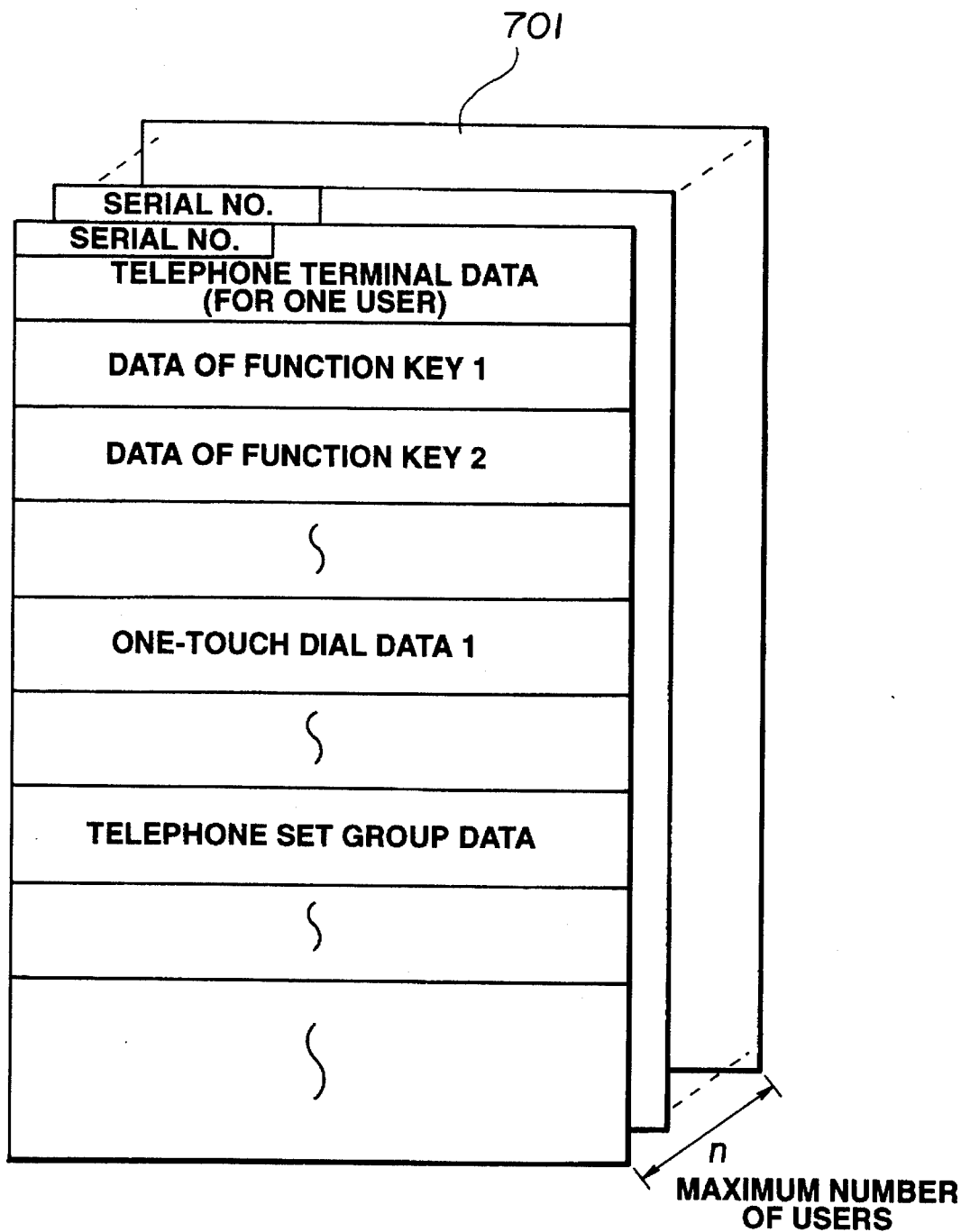
FIG. 5 is a diagram showing storage areas of a memory in the electronic private branch exchange shown in FIG. 2.
Figure 6:
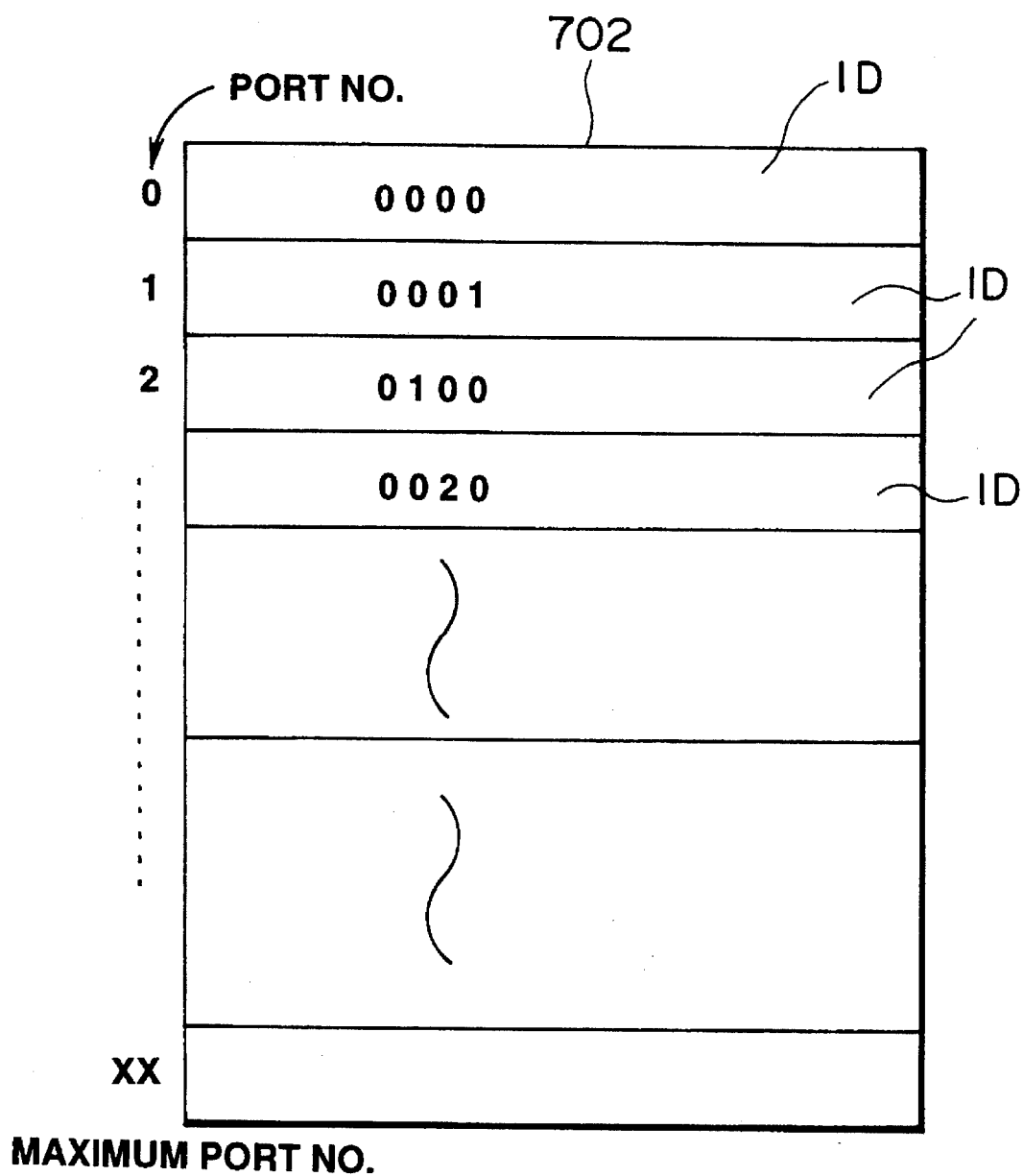
FIG. 6 is a diagram of a data table in the electronic private branch exchange shown in FIG. 2.
Figure 7:
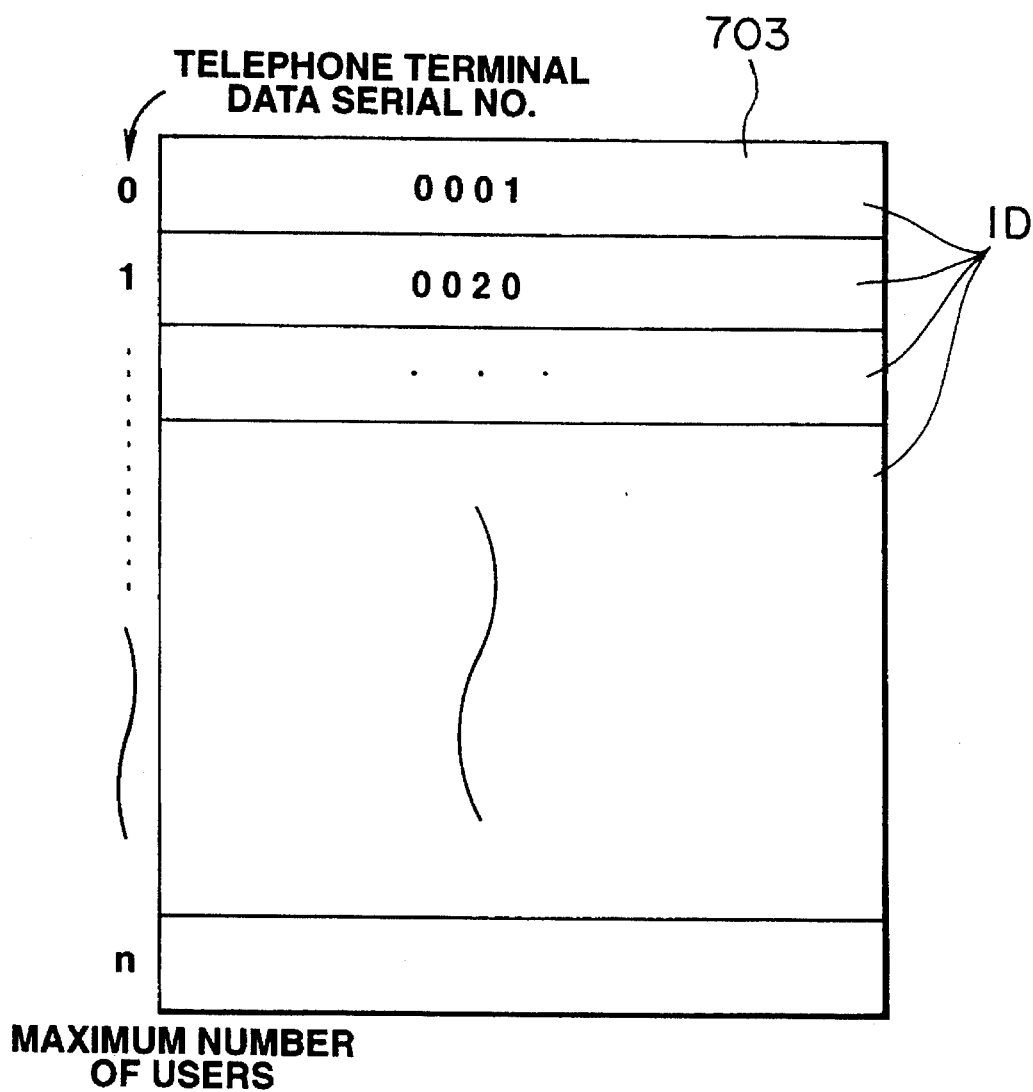
FIG. 7 is a diagram of another data table in the electronic private branch exchange shown in FIG. 2.

The telephone terminal data memory devices 701, the first memory table 702, and the second memory table 703 of the memory 7 have storage space or area arrangements shown in FIGS. 5, 6, and 7, respectively. As shown in FIG. 5, each of the telephone terminal data memory devices 701 stores telephone terminal data such as for limiting outgoing calls, function key data, one-touch dial key data, etc. with respect to one serial number. As shown in FIG. 6, the first memory table 702 stores individual identification information in association with the port numbers of the respective telephone terminals $4_1$~$4_m$. As shown in FIG. 7, the second memory table 703 stores individual identification information in association with the respective serial numbers. Therefore, insofar as the first memory table 702 stores appropriate information, when a certain telephone terminal is used, the individual identification information corresponding to the port number of the telephone terminal can be determined from the first memory 702, the serial number corresponding to the individual identification information can be determined from the second memory 703, and the telephone terminal data corresponding to the individual identification information can be obtained from the corresponding telephone terminal data memory device 701 based on the determined serial number.

Operation of the telephone system according to the present invention will be described below.

Figure 8:
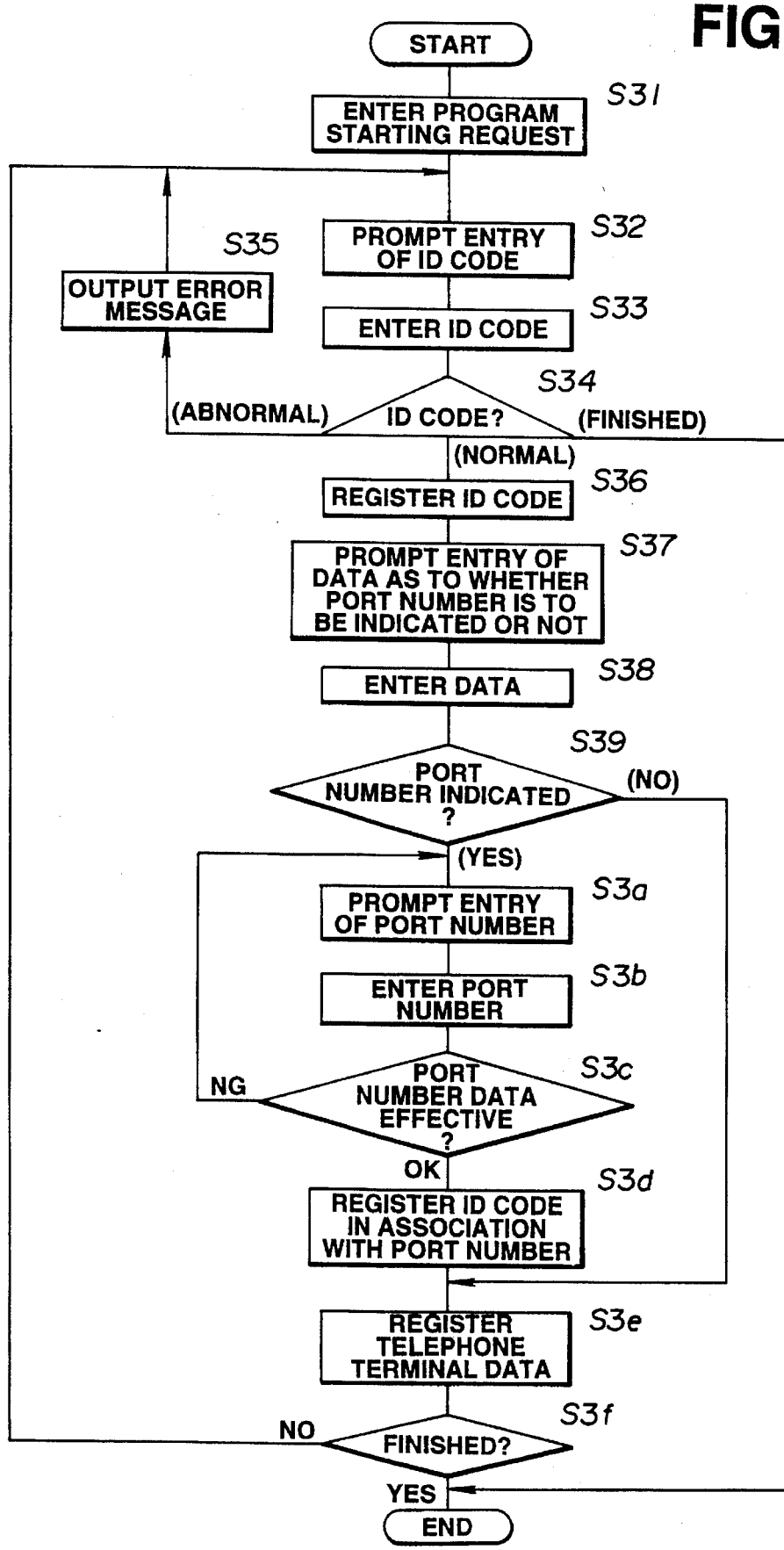
FIG. 8 is a flowchart of a processing sequence in the telephone system for generating individual telephone terminal data for respective users and associating the generated individual telephone terminal data with individual identification information.

FIG. 8 shows a processing sequence, or a registering process, of the data registering device 506 for generating individual telephone terminal data for respective users and associating the generated individual telephone terminal data with individual identification information. First, a program starting request is entered for registering individual telephone terminal data in a step S31. Then, the entry of individual identification information is prompted in a step S32, and desired individual identification information to be set, which corresponds to a user, actually telephone terminal data, is entered in a step S33. Thereafter, the data registering device 506 determines whether the individual identification information is normal, abnormal, or finished in a step S34. If the individual identification information is abnormal, then an error message is outputted and displayed in a step S35, and then the entry of individual identification information is prompted again in the step S32. If the individual identification information is finished in the step S34, then the registering process comes to an end. If the individual identification information is normal in the step S34, then it is registered in the second memory table 703 in association with a telephone terminal data serial number in a step S36. Thereafter, the entry of data representing whether a port number is to be indicated or not for association with the individual identification information is prompted in a step S37, and such data are entered in a step S38. If a port number is not to be indicated in a step S39, then the individual identification information is not associated with any port number, and telephone terminal data of an indicated user (indicated individual identification information) are registered in the corresponding telephone terminal data memory device 701 according to a conventional registering process in a step S3e. If a port number is to be indicated in the step S39, then the entry of the port number is prompted in a step S3a, and the port number to be registered is entered in a step S3b. Thereafter, the data registering device 506 determines whether the entered port number data are effective or not in a step S3c. If effective, then the individual identification information is registered in the first memory table 702 in association with the indicated port number, thus associating the port number with the telephone terminal data of the user in a step S3d. Then, the telephone terminal data of the indicated user (indicated individual identification information) are registered in the corresponding telephone terminal data memory device 701 in the step S3e. A step S3f then determines whether the registration of individual identification information of all the telephone terminals has been finished or not. If not finished, then control goes back to the step S32 to establish individual identification information of a next user. If finished, then the registering process is ended. When the registering process is ended, the telephone terminal data memory devices 701, the first memory table 702 (as long as a port number is indicated in the step S39), and the second memory table 703 are completed.

Figure 9:
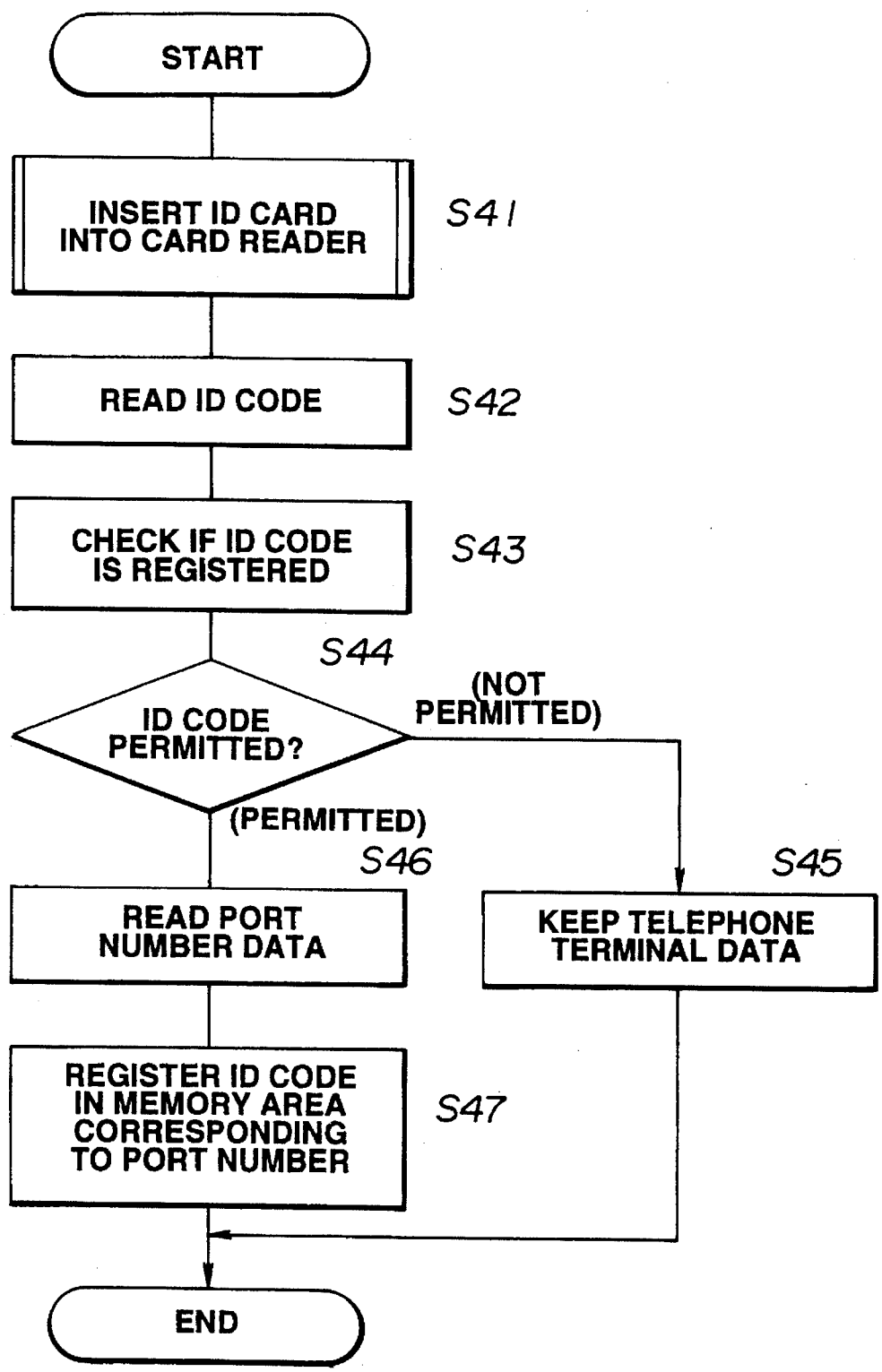
FIG. 9 is a flowchart of a processing sequence in which the electronic private branch exchange actually associates the telephone terminal data of a user with individual identification information.

A processing sequence in which the electronic private branch exchange actually associates the telephone terminal data of a user with the individual identification information thus registered is shown in FIG. 9. The processing sequence shown in FIG. 9 represents operation of the table manager 500 which is composed of the input detector 501, the port number detector 502, and the writing device 503. An ID card with recorded individual identification information is inserted into a card reader 9 to enter the individual identification information in a step S41. As a result, the individual identification information sent from the corresponding telephone terminal is read in a step S42, which is followed by a step S43 which checks if the read individual identification information is among the individual identification information registered in the first memory table 702. If the read individual identification information is among the registered individual identification information, then it is permitted, and if the read individual identification information is not among the registered individual identification information, then it is not permitted in a step S44. If the individual identification information is not permitted, then since there are no corresponding telephone terminal data, the registered telephone terminal data are kept in a step S45, and the processing sequence is finished. If the individual identification information is permitted, then the port number of the telephone terminal to which the card reader 9 is connected is read in a step S46, and individual identification information is registered in a storage area, corresponding to the port number, of the first memory table 302 in a step S47. In this manner, the port number of a telephone terminal is associated with the telephone terminal data of a user corresponding to the telephone terminal, causing the terminal to assume a personalized mode or a P-mode.

Figure 10:
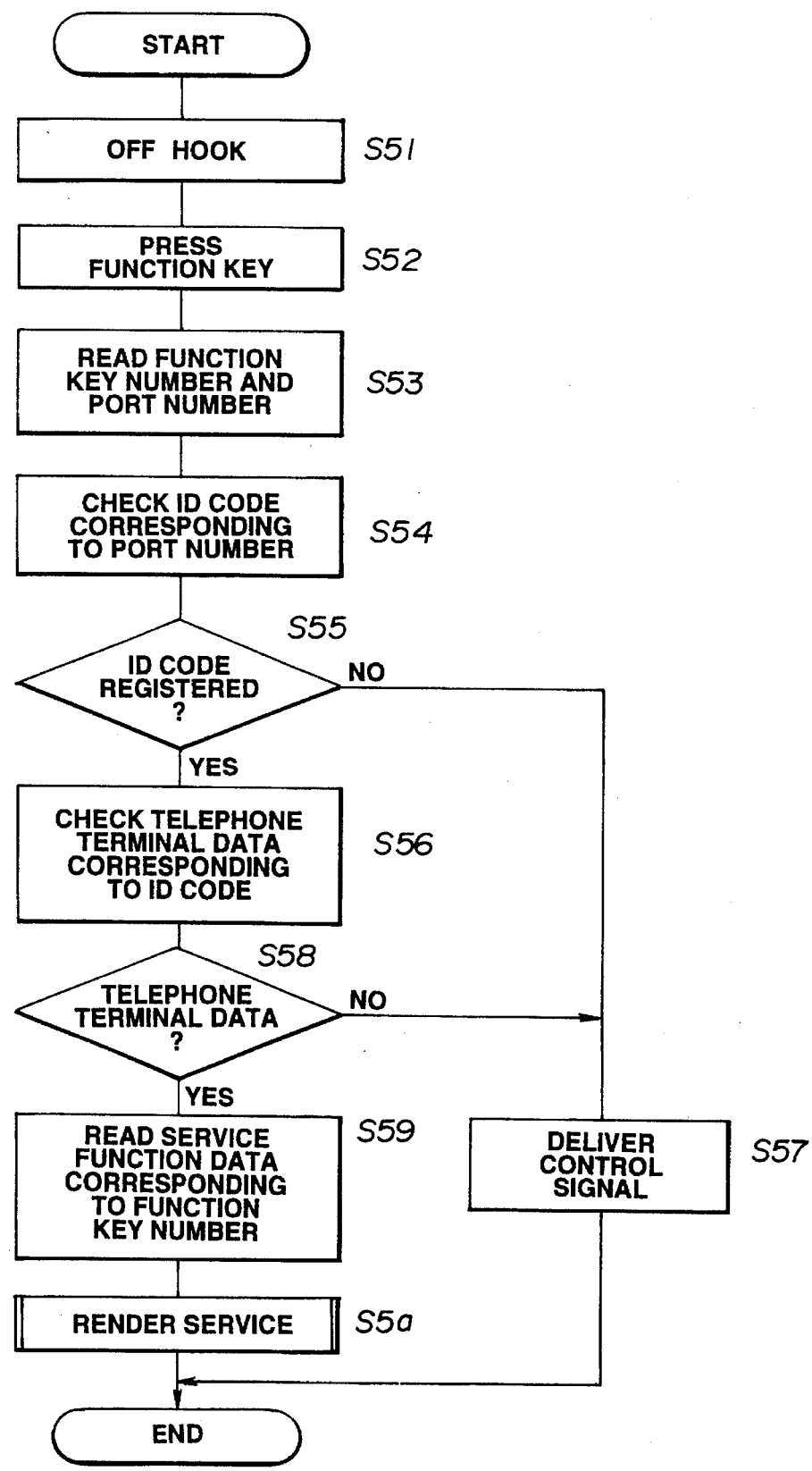
FIG. 10 is a flowchart of a processing sequence carried out at the time when a-service request from a telephone terminal is received.

A processing sequence carried out at the time when the controller 5 receives a service request from a telephone terminal which has been associated with the telephone terminal data of a user will be described below with reference to FIG. 10. The processing sequence represents operation of the data retriever 504 and the telephone service executing device 505. First, the handset of a telephone terminal is taken off hook in preparation for a service request in a step S51, and a function key on the telephone terminal is pressed to enter a service request in a step S52. In response to the depression of the function key, the number of the function key and the port number are read in a step S53. A next step S54 checks if individual identification information is registered in the port number storage areas of the first memory table 702 in order to determine whether the telephone terminal can be used or not. If individual identification information is registered in a step S55, then control goes to a step S56. If no individual identification information is registered in the step S55, then a control signal indicating that the telephone terminal cannot be used is delivered to the telephone terminal and displayed on the telephone terminal in a step S57, and thereafter the processing sequence is finished. In the step S56, the second memory table 703 and the corresponding telephone terminal data memory 701 are checked based on the individual identification information in order to determine whether telephone terminal data corresponding to the individual identification information are established or not. If telephone terminal data are established, then the telephone terminal data are read. If not, then data indicating that no telephone terminal data are established are read. If there are telephone terminal data available in a step S58, then control goes to a step S59. If there are no telephone terminal data available in the step S58, then control goes from the step S58 to the step S57, after which the processing sequence is finished. In the step S59, corresponding service function data in the telephone terminal data which are read in the step S56 based on the function key number read in the step S53 are read in order to determine which service is assigned to the pressed function key on the telephone terminal data. Thereafter, the service assigned to the pressed function key is rendered in a step S5a.

Figure 11:
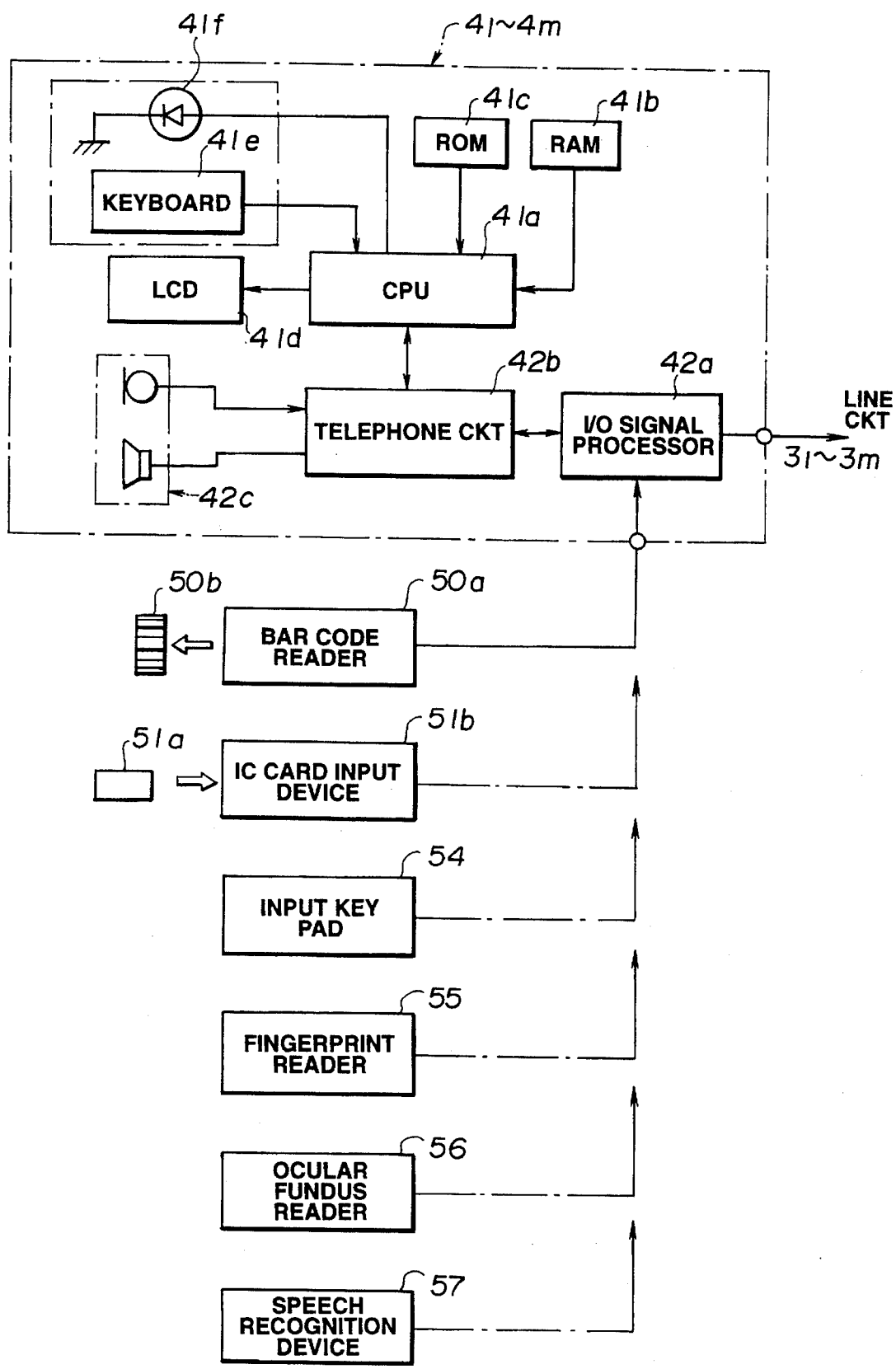
FIG. 11 is a block diagram of a telephone system with other input devices for entering individual identification information according to another embodiment of the present invention.

A telephone system with other input devices for entering individual identification information, rather than the card readers $9_1 \sim 9_m$, according to another embodiment of the present invention will be described below with reference to FIG. 11. The telephone system has a plurality of telephone terminals $4_1 \sim 4_m$ identical to those shown in FIG. 4. The telephone system also includes a bar code reader 50a connected to each of the telephone terminals $4_1 \sim 4_m$. The bar code reader 50a reads a bar code 50b representing individual identification information, and the individual identification information thus read is transmitted through the I/O signal processor 42a and the telephone circuit 42b of each of the telephone terminals $4_1 \sim 4_m$ to the CPU 41a. The transmitted individual identification information is processed in the same manner as described above. The telephone system may employ, as an input device, an IC card 50a storing individual identification information, and an IC card reader 51b for reading the individual identification information recorded in the IC card 50a. Individual identification information may be entered through the ten-key pad of the keyboard 41e of each of the telephone terminals $4_1 \sim 4_m$, or through a key pad 54 which is connected to the I/O signal processor 42a and dedicated for entering individual identification information. Alternatively, the telephone system may employ a fingerprint reader 55 for reading the fingerprint of a user as individual identification information, an ocular fundus reader 56 for reading the blood vessels on the ocular fundus of a user as individual identification information, or a speech recognition device 57 for recognizing the voice of a user as individual identification information.

Since telephone services available at a telephone terminal can be changed based on the individual identification information entered through the telephone terminal, both a card and a password may be entered, and only when the password is verified, the first memory table may be rewritten. Furthermore, telephone terminal data may be entered from a given telephone terminal in addition to the maintenance terminal, and the data stored in the telephone terminal data memory devices and the memory tables may be rewritten by the data input device of the telephone terminal.

After a call has been made using a certain telephone service set by the individual identification information of a user, the telephone service may automatically switch to a standard telephone service to prevent another user from knowing the contents of the P-mode telephone service given to the preceding user. Hereinafter, we refer to the mode of a telephone in a state of providing a standard telephone service as "a standard service mode."

Figure 12:
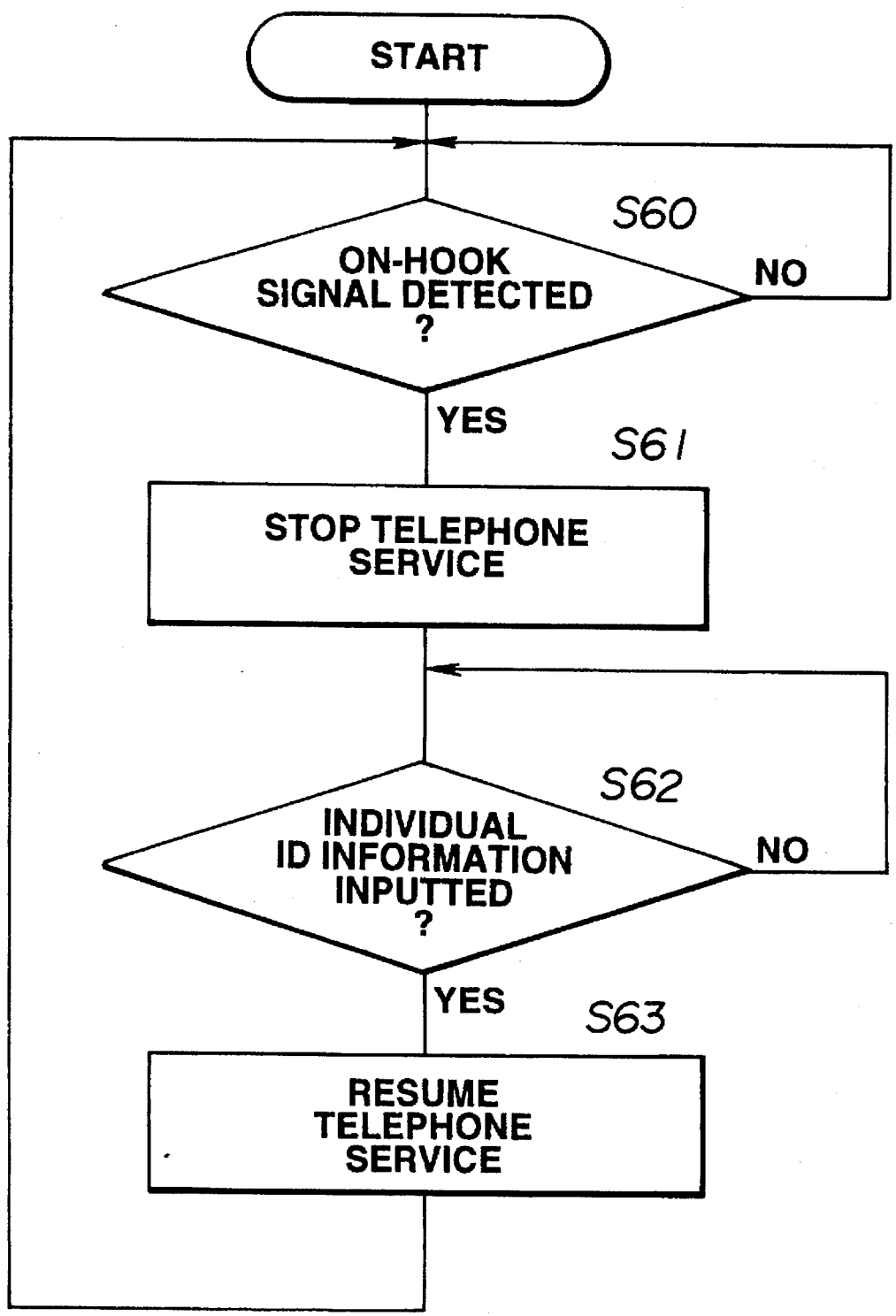
FIG. 12 is a flowchart of a processing sequence for automatically restoring the telephone system from a certain selected telephone service to a standard telephone service.

FIG. 12 shows a processing sequence for automatically restoring the telephone system from a certain selected telephone service to a standard telephone service. In FIG. 12, if an on-hook signal indicative of the completion of a connection established by a telephone terminal $4_i$ (i=4,2 ... m) is detected by the controller 5 through the corresponding one of the line circuits $3_1 \sim 3_m$ in a step S60, a telephone service rendered by the telephone service executing device 505 is stopped in a step S61. If next individual identification information is subsequently entered in a step S62, the telephone service is resumed in a step S63.

After a call has been made using a certain telephone service set by the individual identification information of a user, when the user dials a new telephone number, the previously set telephone service which has been finished may continuously be rendered.

Figure 13:
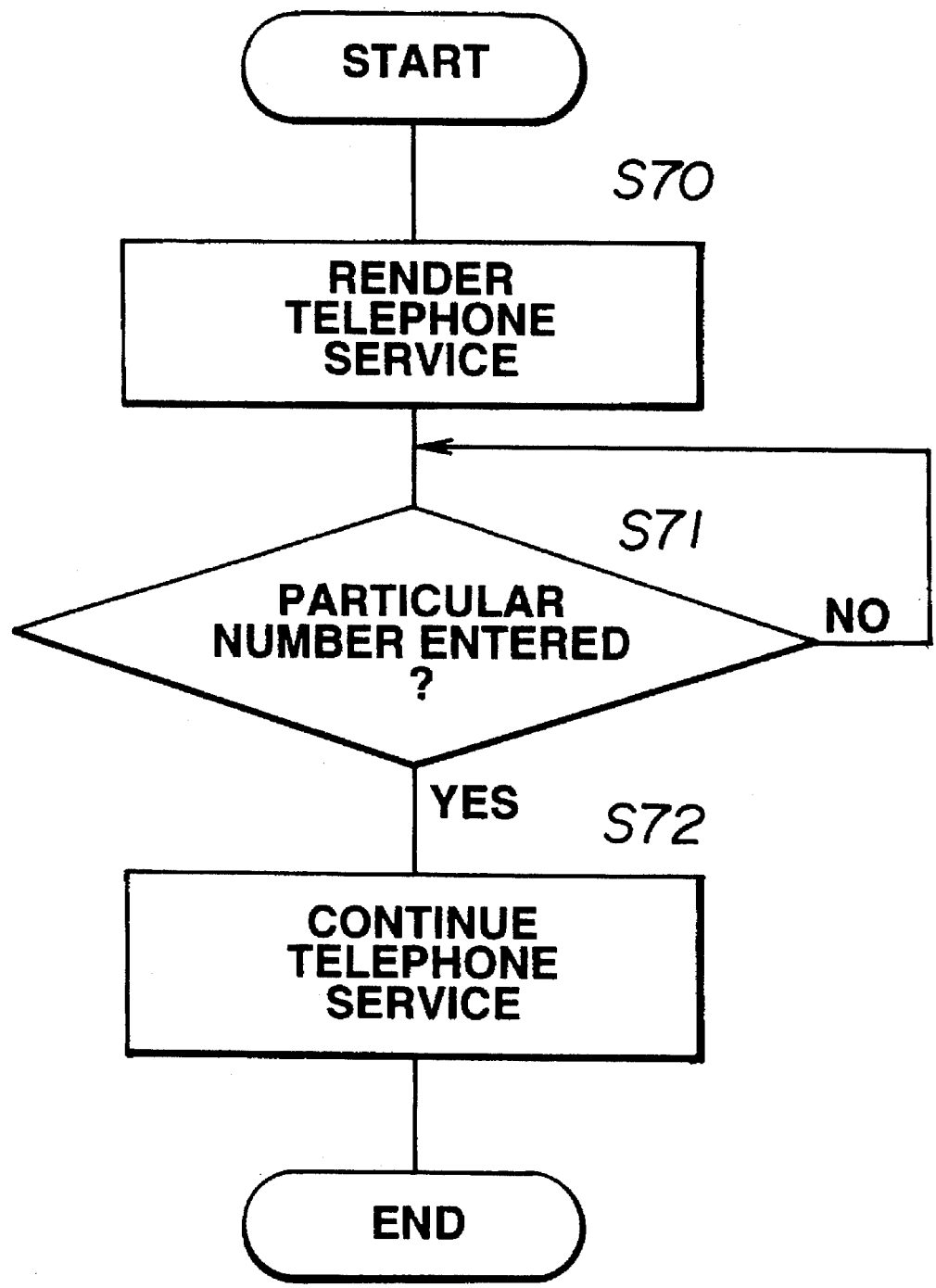
FIG. 13 is a flowchart of a processing sequence for continuing a previously set telephone service after a call has been made.

FIG. 13 shows a processing sequence for continuing a previously set telephone service after a call has been made. In FIG. 13, after a call has been made using a certain telephone service in a step S70, a step S71 waits for a particular number to be entered from the keyboard 41=i eof the telephone terminal $4_1$. If the entry of the particular number is detected by the controller 5, then the previously set telephone service is continuously given by the telephone service executing device 505 in a step S72. Conversely, after a call has been made using a certain telephone service at any one of the telephone terminals $4_1 \sim 4_m$, the user may enter a particular number from the keyboard 41e of the telephone terminal to stop the telephone service rendered by the telephone service executing device 505, and the telephone service may be resumed when next individual identification information is entered.

Since the user may forget to enter the particular number from the keyboard 41e of the telephone terminal the telephone service rendered by the telephone service executing device 505 may be stopped automatically upon elapse of a certain period of time.

Figure 14:
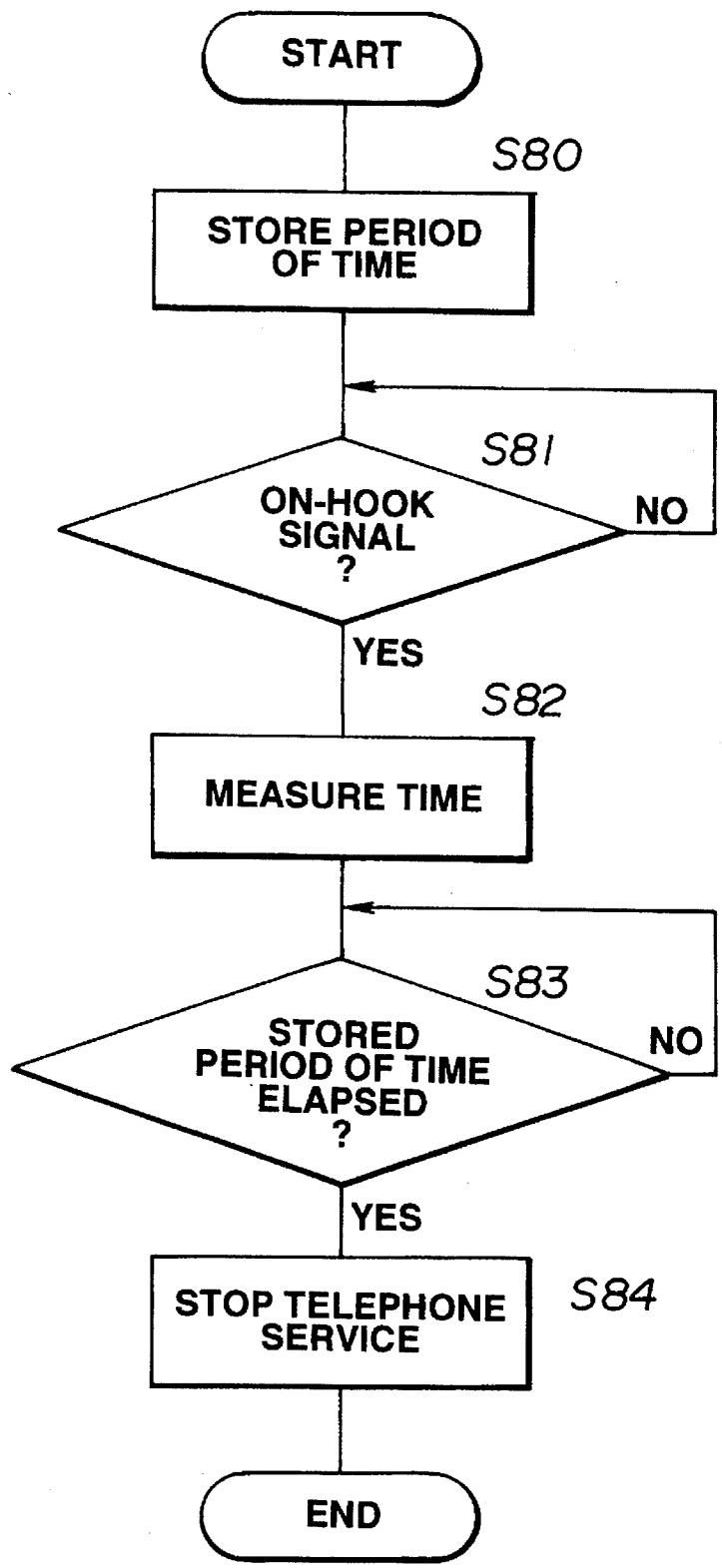
FIG. 14 is a flowchart of a processing sequence for stopping a telephone service upon elapse of a certain period of time.

FIG. 14 shows a processing sequence for stopping a telephone service upon elapse of a certain period of time. In FIG. 14, a period of time to elapse before a telephone service rendered by the telephone service executing device 505 is stopped is stored in the memory 7 shown in FIG. 2 by the maintenance terminal 6 in a step S80. After an on-hook signal indicative of the completion of a call at any one of the telephone terminals $4_1$~$4_m$ is detected by the controller 5 in a step S81, time is measured in a step S82. After the period of time stored in the memory 7 has elapsed in a step S83, the telephone service rendered by the telephone service executing device 505 is stopped in a step S84. The period of time stored in the memory 7 is determined depending on how the telephone terminals $4_1$~$4_m$ are used. For example, the period of time after which the telephone service is to be stopped is selected relatively short on those telephone sets which are used frequently, such as telephone sets in conference rooms. When the same individual identification information as before is entered from the same card reader $403_i$; while the telephone service is being rendered by the telephone service executing device 505, the telephone service being given to the telephone terminal by the telephone service executing device 505 may be stopped.

It is possible to limit the contents of telephone services according to the contents of the individual identification information of each user. For example, outgoing calls may be limited. Specifically, the data retriever 504 searches the first memory table 702 for individual identification information, telephone terminal data according to the limitations of the individual identification information are obtained from the telephone terminal data memory means 701, and only telephone services indicated by the obtained telephone terminal data are rendered by the telephone service executing device 505.

To indicate that a telephone service is being executed, the LED 41f shown in FIG. 4 is energized by the controller 5 which controls the CPU 41a of one of the telephone terminals $4_1$~$4_m$ through the corresponding one of the line circuits $3_1$~$3_m$. When telephone service is stopped, the LED 41f is de-energized. The data of the first memory table 702 which have been rewritten based on the individual identification information by the table manager 500 may be displayed for confirmation by the user. Specifically, the controller 5 controls the CPU 41a of one of the telephone terminals $4_1$~$4_m$ through the corresponding one of the line circuits $3_1$~$3_m$ for enabling the LCD 41d to display the data of the first memory table 702 which have been rewritten by the table manager 500.

In the above embodiments, the data retriever 504 browses the data stored in the first memory table 702 to retrieve individual identification information each time individual identification information is entered, and telephone terminal data according to the limited contents of the individual identification information are obtained from the telephone terminal data memory devices 701, so that a telephone service according the obtained telephone terminal data is executed. However, a telephone service may be executed using another storage medium.

Figure 15:
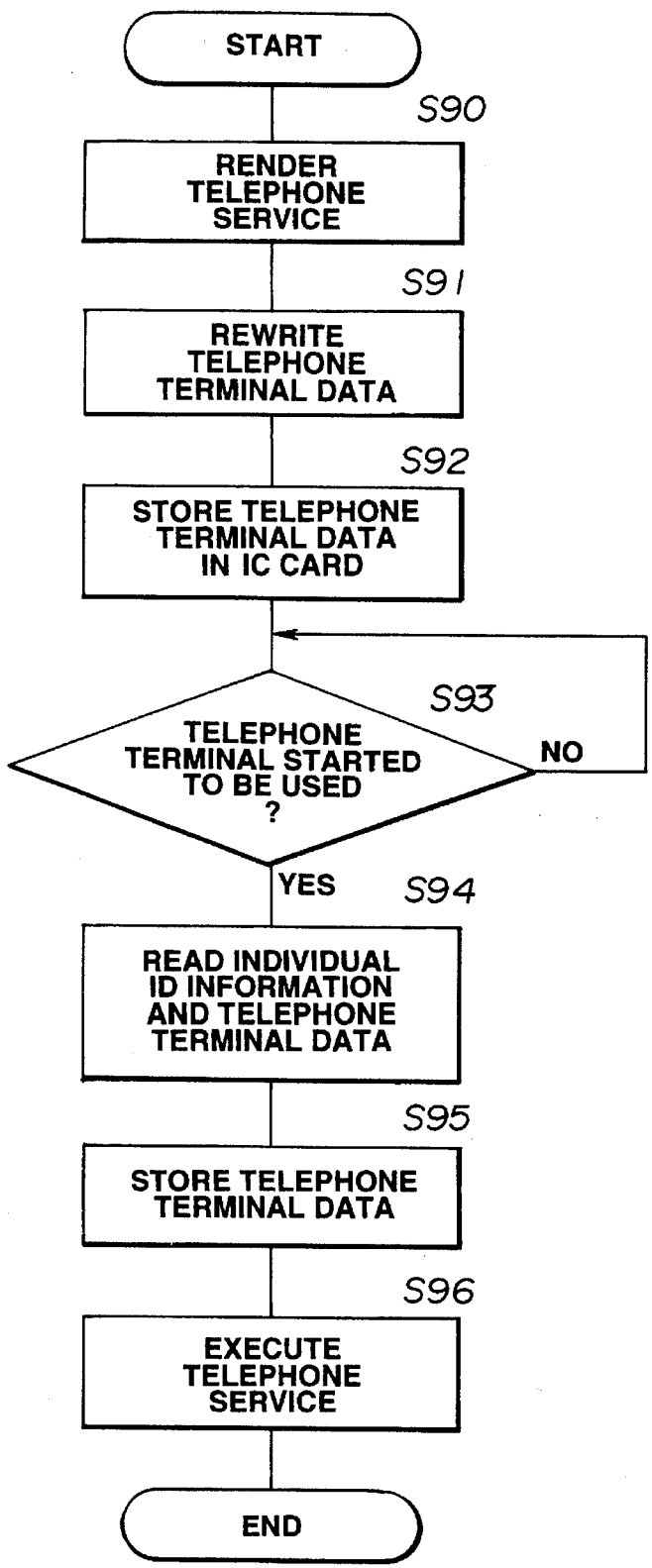
FIG. 15 is a flowchart of a processing sequence for rendering a telephone service using another storage medium.

FIG. 15 shows a processing sequence for executing a telephone service using a different type of storage medium. In FIG. 15, a telephone service is rendered based on the individual identification information stored in the IC card 51a shown in FIG. 11 in a step S90. Telephone terminal data in the first memory table 702 are rewritten based on the individual identification information by the table manager 500 in a step S91, and are stored in another storage area in the IC card 51a in a step S92. When one of the telephone terminals $4_1$~$4_m$ is used next time in a step S93, the individual identification information and stored telephone terminal data are read in a step S94. The read telephone terminal data are directly stored in the first memory table 702 in a step S95, and a telephone service is executed by the telephone service executing device 505 in a step S96. The process shown in FIG. 15 is advantageous in that the storage capacity of the memory 7 which includes the first memory table 702 may be reduced.

If a telephone charge is paid in advance to use a telephone set as in a dormitory telephone system, then it is possible to display the remainder or the charge. Specifically, a telephone charge to be paid in advance is set from the maintenance terminal 6 shown in FIG. 2 or a charge registering machine (not shown), and when any one of the telephone terminals $4_1$~$4_m$ is used to make a call, the controller 5 deducts from the set amount based on the destination to which the call is directed and the time for which the call is continued. The telephone charge is displayed on the LCD 41d shown in FIG. 4 by the CPU 41a of the used one of the telephone terminals $4_1$~$4_m$ which is controlled by the controller 5 through the corresponding one of the line circuits $3_1$~$3_m$. When it is necessary to stop such a telephone service, e.g., when such a telephone service is available only under normal conditions, a certain number is entered from the keyboard 41e of one of the telephone terminals $4_1$~$4_m$ to enable the controller 5 to stop the telephone service.

With the present invention, as described above, each time individual identification information is entered from one of the individual information input devices, information indicative of which person is going to use the corresponding telephone terminal is varied, and when the telephone terminal is used, telephone terminal data corresponding to the individual identification information are obtained, and a telephone service based on the telephone terminal data is given to the telephone terminal. Even when the user uses a shared telephone terminal such as a telephone set in a conference room, a dormitory telephone set, or a telephone set assigned to another user, the shared telephone terminal changes its setting such that it operates as if it is assigned to the user, so that the user can access a desired telephone service simply through that shared telephone terminal.

It is therefore possible to install a number of shared telephone terminals and reduce the number of telephone terminals assigned to individuals for reducing the cost of the telephone system facility. In a dormitory telephone system, for example, even if a plurality of boarding students share one room, a telephone terminal may be installed as a shared telephone terminal in each room, and each boarding student may access a desired telephone service through the shared telephone terminal as if through his own telephone terminal.

Although certain preferred embodiments of the present invention has been shown and described in detail, it should be understood that various changes and modifications may be made therein without departing from the scope of the appended claims.

What is claimed is:

1. In a telephone system for providing personalized services comprising:

a plurality of telephone terminals;

a plurality of individual identifier input means, each associated with one of said telephone terminals, for entering an individual identifier; and a PBX for serving said plurality of telephone terminals, said PBX comprising:

telephone terminal data memory means for storing telephone terminal data each associated with at least an individual identifier;

a first memory table storing an identifier of each of said telephone terminals and, if the telephone terminal is in use, the individual identifier which has been entered from the individual identifier input means associated with said telephone terminal;

associating means responsive to an individual identifier entered from one of said individual identifier input means for associating said individual identifier with the identifier of the telephone terminal with which said one of said individual identifier input means is associated to place said telephone terminal in a personalized mode (hereinafter, referred to as "P mode"); and executing means responsive to a selection of telephone service made from one of the P-mode telephone terminals for executing said selected telephone service for said one of the P-mode telephone terminals on the basis of said telephone terminal data stored in said telephone terminal data memory means and associated with at least said individual identifier, an improvement wherein:

said telephone terminal data comprises first telephone terminal data associated with said individual identifier and optional second telephone terminal data associated with said individual identifier and telephone terminal identifiers which have been specified by the owner of said individual identifier; and said executing means comprises means for executing said selected telephone service on the basis of said second telephone terminal data, if any, and on the basis of said first telephone terminal data, otherwise.

2. The telephone system according to claim 1 wherein said associating means comprises:

input detecting means for detecting whether an individual identifier has been entered from any of said individual identifier input means;

means for detecting an identifier of a telephone terminal associated with an individual identifier input means from which said individual identifier has been entered; and means for writing said individual identifier detected by said input detecting means in said first memory table in association with said identifier detected by said identifier detecting means.

3. The telephone system according to claim 2, wherein said each telephone terminal further comprises display means for displaying the data in said first memory table which is maintained by said associating means based on the individual identifier entered from said individual identifier input means, in response to a given number entered from said one of the P-mode telephone terminals.

4. The telephone system according to claim 1, wherein each of said individual identifier input means comprises a card reader for reading an individual identifier magnetically stored on a magnetic card.

5. The telephone system according to claim 1, wherein each of said individual identifier input means comprises a keyboard for manually entering an individual identifier.

6. The telephone system according to claim 1, wherein each of said individual identifier input means comprises a bar code reader for reading an individual identifier encoded as a bar code.

7. The telephone system according to claim 1, wherein each of said individual identifier input means comprises an IC card reader for reading an individual identifier stored in an IC card.

8. The telephone system according to claim 1, wherein each of said individual identifier input means comprises a key pad for manually entering an individual identifier.

9. The telephone system according to claim 1, wherein each of said individual identifier input means comprises a fingerprint reader for reading and recognizing a fingerprint of a user to obtain the individual identifier of said user.

10. The telephone system according to claim 1, wherein each of said individual identifier input means comprises an ocular fundus reader for reading and recognizing the blood vessel pattern on the ocular fundus of a user to obtain the individual identifier of said user.

11. The telephone system according to claim 1, wherein each of said individual identifier input means comprises a speech recognition device for recognizing the voice of a user to obtain the individual identifier of said user.

12. The telephone system according to claim 12 wherein said PBX further comprises:

a second memory table stored, each time an individual registers telephone terminal data in said telephone terminal data memory means, with the individual identifier of said individual and a telephone terminal identifier specified by said individual with said two identifiers associated with a serial number; and means responsive to a telephone terminal data registration request from said individual for accepting and registering said telephone terminal data as said first telephone terminal data in said telephone terminal data memory means if any terminal identifier is not specified, and if any terminal identifier is specified, accepting and registering said telephone terminal data as said second telephone terminal data in said telephone terminal data memory means, and for registering said individual identifier of said individual and said specified terminal identifier in said second memory table with said two identifiers associated with said serial number.

13. The telephone system according to claim 12, further comprising a maintenance terminal for rewriting data in said second memory table.

14. The telephone system according to claim 1 or 12, wherein each of said telephone terminals has a keyboard for permitting a user to enter data.

15. The telephone system according to claim 14, wherein:

said associating means further comprises means responsive to a given number entered from said keyboard of said one of the P-mode telephone terminals for dissociating said individual identifier from said identifier of said telephone terminal to restore said one of the P-mode terminal to a standard service mode, on the basis of the telephone terminal data associated with said given number.

16. The telephone system according to claim 1, wherein said associating means comprises means for putting into practice said associating said individual identifier with the identifier of the telephone terminal only when a password entered after the individual identifier has been entered agrees with the password associated with said individual identifier.

17. The telephone system according to claim 1, wherein said telephone terminal has light emitting means for emitting light while said selected telephone service is being executed with respect to said one of the P-mode telephone terminals and for turning off light when said selected telephone service is stopped.

18. In a telephone system for providing personalized services comprising:

a plurality of telephone terminals;

a plurality of individual identifier input means, each associated with one of said telephone terminals, for entering an individual identifier; and a PBX for serving said plurality of telephone terminals, said PBX comprising:

telephone terminal data memory means for storing telephone terminal data each associated with at least an individual identifier;

a first memory table storing an identifier of each of said telephone terminals and, if the telephone terminal is in use, the individual identifier which has been entered from the individual identifier input means associated with said telephone terminal;

associating means responsive to an individual identifier entered from one of said individual identifier input means for associating said individual identifier with the identifier of the telephone terminal with which said one of said individual identifier input means is associated to place said telephone terminal in a personalized mode (hereinafter, referred to as "P-mode"); and executing means responsive to a selection of telephone service made from one of the P-mode telephone terminals for executing said selected telephone service for said one of the P-mode telephone terminals on the basis of said telephone terminal data stored in said telephone terminal data memory means and associated with at least said individual identifier, an improvement wherein said executing means further comprises:

means responsive to an on-hook at said one of the P-mode telephone terminals for stopping said selected telephone service for said one of the P-mode terminals and restoring said one of the P-mode terminals to a standard service mode; and means responsive to the same individual identification information entered subsequently after said stopping from said one of said individual identification information input means for resuming said selected telephone service.

19. The telephone system according to claim 18 wherein said PBX further comprises:

means for starting to measure elapsed time at the time of said on-hook at said one of the P-mode telephone terminals; and means operative at the time when said measured elapsed time reaches a present period of time registered in association with said one of the P-mode telephone terminals for supplying a signal and said executing means further comprises:

means responsive to said signal for restoring said one of the P-mode telephone terminals to the standard service mode.

20. The telephone system according to claim 19 further comprising:

a maintenance terminal for permitting a user to register said present period of time.

21. The telephone system according to any one of claims 1, 18, and 19 wherein:

each telephone terminal has a keyboard; and said executing means further comprises means responsive to a predetermined number entered from the keyboard of said one of the P-mode telephone terminals during execution of said selected telephone service for keeping said one of the P-mode telephone terminals in the P-mode after the completion of a current call from said one of the P-mode telephone terminals.

22. The telephone system according to any one of claims 1, 18, and 19 wherein:

each telephone terminal has a keyboard; and said executing means further comprises means responsive to a predetermined number entered from the keyboard of said one of the P-mode telephone terminals during execution of said selected telephone service for restoring said one of the P-mode terminal to the standard service mode after the completion of a current call from said one of the P-mode telephone terminals.

23. The telephone system according to claim 1 or 18 wherein:

at least a part of said each individual identifier represents one of a plurality of classes; and said first and second telephone terminal data are limited according to said one of said classes.

24. The telephone system according to claim 1 or 18 wherein said PBX further comprises:

means operative in case when the same individual identifier as entered from said one of said individual identifier input means is entered from the individual identifier input means associated with a terminal other than said one of the P-mode telephone terminals while said one of the P-mode telephone terminals remains in the P-mode for restoring said one P-mode terminal to the standard service mode.

25. The telephone system according to claim 1 or 18 wherein:

said each individual identifier input means comprises an IC card reader/writer for entering an individual identifier, and associated telephone terminal data if any, from an IC card and writing said associated telephone terminal data in said IC card;

said executing means comprises first means responsive to said selection of telephone service made from one of the P-mode telephone terminals for executing said selected telephone service for said one of the P-mode telephone terminals by using said individual identifier entered from said IC card reader/writer; and said PBX further comprises means operative on the completion of said selected telephone service executed by said first means for storing said associated telephone terminal data which may have been rewritten, in said IC card through said IC card reader/writer.

26. The telephone system according to claim 1 or 18 wherein said PBX further comprises:

means responsive to an input of the prepaid amount of money associated with each individual for registering said prepaid amount of money as a piece of the telephone terminal data of the individual in said telephone terminal data memory means; and means responsive to a charging signal sent from an exchange office to said one of the P-mode telephone terminals for deducting the amount based on said charging signal from the content of said piece of said telephone terminal data of said individual and rewriting the balance over said piece of said telephone terminal data; and means for displaying said balance on said one of the P-mode telephone terminals.

\* \* \* \* \*